(12) United States Patent
Dey

(10) Patent No.: US 10,200,760 B2
(45) Date of Patent: *Feb. 5, 2019

(54) METHOD AND APPARATUS FOR PROVIDING A MOBILE VIDEO BLOG SERVICE

(71) Applicant: Red Hat, Inc., Raleigh, NC (US)

(72) Inventor: Spondon Dey, Long Beach, NJ (US)

(73) Assignee: Red Hat, Inc., Raleigh, NC (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/443,680

(22) Filed: Feb. 27, 2017

(65) Prior Publication Data

US 2017/0180812 A1    Jun. 22, 2017

Related U.S. Application Data

(63) Continuation of application No. 14/929,670, filed on Nov. 2, 2015, now Pat. No. 9,584,865, which is a
(Continued)

(51) Int. Cl.
| | |
|---|---|
| *H04N 21/4788* | (2011.01) |
| *G06Q 30/02* | (2012.01) |
| *H04L 29/06* | (2006.01) |
| *H04L 29/08* | (2006.01) |
| *H04N 21/41* | (2011.01) |
| *H04N 21/45* | (2011.01) |
| *H04N 21/61* | (2011.01) |

(Continued)

(52) U.S. Cl.
CPC ..... *H04N 21/4788* (2013.01); *G06Q 30/0241* (2013.01); *G06Q 30/0269* (2013.01); *H04L 65/4084* (2013.01); *H04L 67/2833* (2013.01); *H04L 67/306* (2013.01); *H04N 21/2541* (2013.01); *H04N 21/4126* (2013.01); *H04N 21/4524* (2013.01); *H04N 21/4532* (2013.01); *H04N 21/6125* (2013.01); *H04N 21/6131* (2013.01); *H04N 21/812* (2013.01); *H04N 21/8173* (2013.01)

(58) Field of Classification Search
CPC .............. H04L 67/306; H04L 67/2833; H04N 21/4789; H04N 21/4126; H04N 21/4524; H04N 21/4532; H04N 21/6125; H04N 21/6131; H04N 21/812
USPC .......................... 455/557; 707/717, 736, 758
See application file for complete search history.

(56) References Cited

U.S. PATENT DOCUMENTS

| | | | |
|---|---|---|---|
| 8,150,464 B2 * | 4/2012 | Dey ................... | G06Q 30/0241 455/557 |
| 8,302,162 B1 * | 10/2012 | Sridharan ......... | G06F 17/30073 709/227 |

(Continued)

*Primary Examiner* — Lam T Mai
(74) *Attorney, Agent, or Firm* — Withrow & Terranova, PLLC

(57) ABSTRACT

A method and apparatus for providing a mobile video blog (vlog) service in a communication network are disclosed. For example, the method captures video content sourced from a mobile device used by a mobile user through a mobile vlog posting service portal, and provides a vlog viewing function accessible to a viewer through a vlog viewing service portal, wherein the vlog viewing function affords viewing of the video content and is provided in accordance with a user profile of the viewer, wherein the user profile comprises a viewing preference of the viewer.

20 Claims, 4 Drawing Sheets

Related U.S. Application Data continuation of application No. 13/437,600, filed on Apr. 2, 2012, now Pat. No. 9,178,961, which is a continuation of application No. 12/341,660, filed on Dec. 22, 2008, now Pat. No. 8,150,464.

(51) Int. Cl.
*H04N 21/81* (2011.01)
*H04N 21/254* (2011.01)

(56) References Cited

U.S. PATENT DOCUMENTS

| | | | |
|---|---|---|---|
| 8,788,516 B1 * | 7/2014 | Jakubik | G06Q 50/01 |
| | | | 706/20 |
| 9,058,592 B2 * | 6/2015 | Vitaldevara | G06Q 10/107 |
| 9,178,961 B2 * | 11/2015 | Dey | G06Q 30/0241 |
| 9,195,753 B1 * | 11/2015 | King | G06F 17/30867 |
| 9,213,754 B1 * | 12/2015 | Zhang | G06F 17/30867 |
| 9,230,241 B1 * | 1/2016 | Singh | G06F 3/00 |
| 9,584,865 B2 * | 2/2017 | Dey | G06Q 30/0241 |
| 2005/0064852 A1 | 3/2005 | Baldursson | |
| 2006/0019699 A1 | 1/2006 | Chang et al. | |
| 2006/0218482 A1 | 9/2006 | Ralston et al. | |
| 2010/0161635 A1 | 6/2010 | Dey | |
| 2012/0189282 A1 | 7/2012 | Wyatt et al. | |
| 2012/0197735 A1 | 8/2012 | Dey | |
| 2013/0311586 A1 | 11/2013 | Anand et al. | |

* cited by examiner

METHOD AND APPARATUS FOR PROVIDING A MOBILE VIDEO BLOG SERVICE

This application is a continuation of U.S. patent application Ser. No. 14/929,670, now U.S. Pat. No. 9,584,865, which is a continuation of U.S. patent application Ser. No. 13/437,600, filed Apr. 2, 2012, now U.S. Pat. No. 9,178,961, which is a continuation of U.S. patent application Ser. No. 12/341,660, filed Dec. 22, 2008, now U.S. Pat. No. 8,150,464, all of which are herein incorporated by reference in their entirety.

The present invention relates generally to wireless communication networks and, more particularly, to a method and apparatus for converging a wireless subscriber community and a web community by providing a mobile video blog service.

BACKGROUND OF THE INVENTION

Existing web log (blog) or video blog (vlog) allows mobile device users to post contents with the convenience of their mobile devices. However, these blogs or vlogs operate independently from the wireless networks and the subscriber profiles of the mobile device users from the wireless networks who view these blog or vlog are not available to the blog operator or vlog operator.

SUMMARY OF THE INVENTION

In one embodiment, the present invention discloses a method and apparatus for providing a mobile video blog (vlog) service in a communication network. For example, the method captures video content sourced from a mobile device used by a mobile user through a mobile vlog posting service portal, and provides a vlog viewing function accessible to a viewer through a vlog viewing service portal, wherein the vlog viewing function affords viewing of the video content and is provided in accordance with a user profile of the viewer, wherein the user profile comprises a viewing preference of the viewer.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
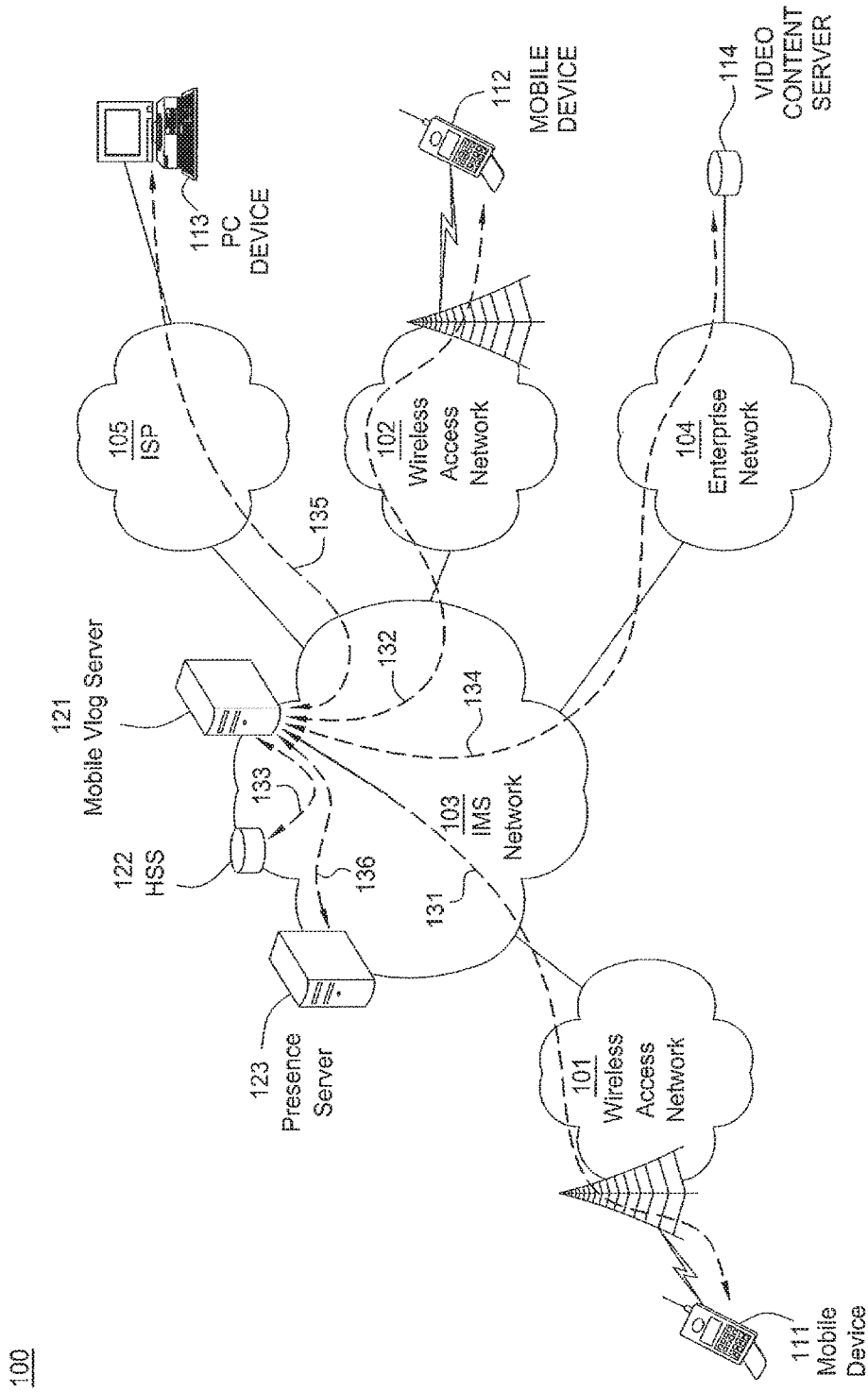
FIG. 1 illustrates an exemplary communication network supporting the convergence of wireless subscriber community and web community using mobile video blog and service portal in accordance with one embodiment of the present invention.

As discussed above, existing web log (blog) or video blog (vlog) allows mobile device users to post contents with the convenience of their mobile devices. However, these blogs or vlogs operate independently from the wireless networks and the subscriber profiles of the mobile device users from the wireless networks who view these blog or vlog are not available to the blog or vlog operator.

By integrating subscriber profiles of the wireless device users with blog or vlog operations, a wireless service provider can benefit from the convergence of the web community with the wireless subscriber community. For example, subscriber profile data (e.g., wireless users' usage patterns, preferences and the like) from a wireless network can be leveraged to support marketing initiatives such as advertisement (ad) insertions.

To address this need, embodiments of the present invention enable the convergence of the wireless subscriber community and the web community by providing a mobile video blog service (e.g., posting of vlogs and/or viewing of vlogs via one or more portals). In one embodiment, the present invention enables the convergence of the wireless subscriber community and the web community by providing a mobile video blog service by integrating mobile video log (vlog) applications with an Internet Protocol Multimedia Subsystem (IMS) network.

Broadly defined, IMS is an architectural framework for delivering Internet Protocol (IP) multimedia to mobile users defined by the standard body, 3rd Generation Partnership Project (3GPP). This integration with IMS allows a mobile vlog service to use subscriber data from the Home Subscriber Server (HSS) in an IMS network for user profile information that can be leveraged for intelligent revenue generating functions such as ad insertion or presentation. In one embodiment, the HSS is an IP-based Authentication, Authorization, and/or Accounting (AAA) server that contains a master database for storing subscriber profiles (broadly referred to as user profiles), registration data, and network policy rules.

In one embodiment, the present invention provides a web browser based application that supports video editing functionality and live video streaming integration for live events through a mobile video blog (vlog) posting service portal. For example, the videos from the mobile device can be streamed in real time for live capture events or as uploaded video files. The application integrates these videos into a blog format via a mobile vlog posting service portal, thereby creating the mobile video blog. These video blogs can be shared to a community both public and private as specified within the browser based application by the vlogger.

In one embodiment, the features of this browser based application may include a subscriber login portal, blog templates that a vlogger can select, browser based video editing capabilities (like adding fades, video effects or splicing functionality), category and key words assignment, post-to-web server functionality both as uploaded video file or live streaming video, and community or social networking video sharing via an Application Programming Interface (API) support.

In one embodiment, the present invention can also allow a mobile vlogger to opt in for ad insertion capabilities and revenue sharing opportunities. For example, this application allows amateur journalists who wish to offer either live or uploaded mobile vlog to capture live or eyewitness news. Journalism companies can create APIs into the application to filter the amateur journalist contents posted in various categories to be used for broadcast or re-broadcast. In addition, these companies can use the present invention to validate contents and news by contacting the amateur journalist who posted the vlog contents via integrated email or instant messaging (IM).

Additionally, as part of this application, a community viewing service portal (broadly referred to as video blog (vlog) viewing service portal) is supported to allow viewers to view live streaming or uploaded video file contents via their personal computers, laptops, or mobile devices via the World Wide Web that have been posted by mobile vloggers. Note that viewers are different from mobile vloggers, where viewers view video contents posted by mobile vloggers. In one embodiment, features of the community viewing portal include the ability (e.g., one or more functions) to comment and reply on a mobile vlog, rate a mobile vlog, view vlogs by groups and categories, view vlogs by the most viewed, view vlogs by the highest rating, and so on.

FIG. 1 illustrates an exemplary communication network 100 for supporting the convergence of the wireless subscriber community and the web community by providing the mobile video blog and service related to the present invention. In FIG. 1, wireless access networks 101 and 102, Internet Service Provider (ISP) network 105, and enterprise network 104 are all interconnected with the Internet Protocol Multimedia Subsystem (IMS) Network 103. In one embodiment, wireless access network 101, wireless access network 102 and IMS network 103 can be supported by a single service provider. In another embodiment, wireless access networks 101 and 102 are part of the overall IMS network 103.

In one embodiment, the IMS network 103 comprises a mobile video blog (vlog) server 121 which supports mobile vlog functions and a Presence Server (PS) 123 which supports presence related functions associated with users in the IMS network 103. Note that mobile vlog server 121 is a separate application server in the IMS network 103 for supporting mobile vlog related applications of the present invention. Furthermore, although the mobile video blog (vlog) server 121 is illustrated as being deployed within the IMS network, the mobile video blog (vlog) server 121 can be deployed in a wireless network in an alternate embodiment. Home Subscriber Server (HSS) is an IP-based Authentication, Authorization, and/or Accounting (AAA) server that contains a master database for storing subscriber profiles, registration data, and network policy rules in IMS network 103. Presence Server (PS) 123 manages information on a user's location, context, presence (e.g., current location, availability, preferred means of communication, etc.) and enables communication services to take advantage of the presence related information.

In one embodiment, mobile device endpoints 111 and 112 are all subscribers of the IMS network 103. Personal computer device endpoint 113 is also a subscriber of the IMS network 103. For example, mobile device 111 may access the mobile vlog server in the IMS network 103 via the wireless access network 101 using flow 131, whereas mobile device 112 may access mobile vlog server in the IMS network 103 via wireless access network 102 using flow 132. PC device 113 may access the mobile vlog server in the IMS network 103 via the ISP network 105 using flow 135.

In one embodiment, mobile devices 111 and 112 may include, second generation (2G) mobile phone, third generation (3G) mobile phone, fourth generation (4G), mobile phone, smart phone, and personal digital assistant (PDA) that support 2G, 3G, 4G, cellular, WiMAX, and WiFi network connectivity. Wireless access networks 101 and 102 may include 2G cellular networks, 3G cellular networks, 4G cellular networks (of which Long Term Evolution (LTE) is an example), WiFi networks, WiMAX networks and the like. It should be noted that the present invention is not limited to any particular type of wireless access network.

Broadly defined, Wi-Fi is a wireless local area network (WLAN) technology based on the Institute of Electrical & Electronics Engineers (IEEE) 802.11 standards. WiMAX is a wireless metropolitan are network (MAN) technology based on the Institute of Electrical & Electronics Engineers (IEEE) 802.16 standards. 2G is the second generation cellular network technology while 3G is the third generation cellular network technology and 4G is the fourth generation cellular network technology.

In addition, Video Content Server 114 may access the mobile vlog server 121 in the IMS network 103 via an enterprise network 104, which is connected to the IMS network 103 but is independently operated, using flow 134.

In one embodiment, the user of the mobile device 111 is a mobile video blog user (vlogger). The mobile vlogger accesses a mobile video blog (vlog) posting service portal that is supported by the mobile vlog server 121 using the mobile device 111 via flow 131.

In one embodiment, mobile vlog server 121 provides a web browser based application to the mobile device 111 to support video editing functionality and live video streaming integration for live events. Using this application, video capture components of the mobile device 111 including camera, video codecs, and any other video capture capabilities are integrated. The videos captured by the mobile device 111 can be streamed in real time for live capture events or uploaded as video files. The web browser based application integrates these videos into a blog format via the mobile vlog posting service portal, thereby creating the mobile video blog. In one embodiment, the browser based application may provide classifications of the vlogs by categories, e.g., "amateur journalism", "entertainment", "personal" and so on that can be selected and classified by the vlogger. These video blogs can then be shared to a community both public and private as specified within the application by the mobile vlogger.

In one embodiment, the features of this web browser based application may include a subscriber login portal, blog templates that a mobile vlogger can select, browser based video editing capabilities or functions (like adding fades, video effects or splicing functionality), category and key words assignment, post-to-web server functionality both as uploaded video file or live streaming video, and community or social networking capabilities to tie captured videos into other social networking communities (e.g., YouTube of San Mateo, Calif.; Veoh of San Diego, Calif.; MySpace of Santa Monica, Calif.; Facebook of Palo Alto, Calif., and the like) through Application Programming Interfaces (APIs).

In one embodiment, mobile vlog server 121 may also allow the vlogger of mobile device 111 to opt in for ad insertion capabilities and revenue sharing opportunities. If the vlogger chooses to opt in for the ad insertion feature, then ads relevant to a viewer will be inserted or presented by mobile vlog server 121 when the viewer initiates a vlog viewing session.

In one embodiment, the user of the mobile device 112 is a video blog viewer. The user, or the viewer, accesses a video blog (vlog) viewing service portal supported by the mobile vlog server 121 by using the mobile device 112 via flow 132.

In one embodiment, the mobile vlog server 121 provides a web browser based application to the mobile device 112 to allow the viewer to view live streaming or uploaded video contents via the mobile device 112 through the World Wide Web that have been posted by the mobile vlogger of mobile device 111. Note that vlog viewers are different from mobile vloggers where viewers view video contents posted by mobile vloggers.

Features of the vlog viewing service portal may include the ability to comment and reply on a mobile vlog, rate a mobile vlog, view vlogs by groups and categories, view vlogs by the most viewed, view vlogs by the highest rating, and so on.

In one embodiment, if the mobile vlogger has opted in for the ad insertion feature, mobile vlog server 121 may retrieve subscriber profile data of the viewer of the mobile device 112 from HSS 122, using flow 133, to insert ads that are relevant to the viewer when a vlog viewing session is initiated. In one embodiment, HSS 122 contains information of the viewer using the mobile device 112 including usage patterns and various preferences that can be used to select relevant ads to be inserted according to this subscriber profile information.

Broadly defined, usage patterns pertain to a method that monitors the usage pattern of a user, thereby learning the preference of the user. For example, a monitoring method may monitor the type of videos that is being accessed by a viewer or the comments provided by the viewer after viewing a video, thereby deducing the type of videos that the user prefers to watch.

Alternatively, a viewer may actively define a viewing preference during a setup process, a subscription process, or a viewing preference update process. For example, a viewer may define that he prefers subject matters that pertains to sports, news, breaking news only, weather, financial topics, celebrity news, events pertaining to a specific geographic region (e.g., a continent, a country, a state, a county, a town and the like), events pertaining to a specific person (e.g., a specific politician, a specific athlete, a specific celebrity, and so on), events pertaining to a specific organization (e.g., a political organization, a charitable organization, a technical organization, a particular company, a trade organization, a sports organization and the like). Thus, unlike usage pattern detection where a monitoring method is attempting to guess at the interest of the viewer, or simple user association with other users (e.g., association of the user to other users becomes a triggering or filtering parameter for accessing content), the viewing preference as defined by a viewer will allow the viewer to set a definitive boundary of his viewing preference with specificity and a high level of granularity that is not available through the use usage pattern detection. Thru the use of the viewing preference, a viewer will avoid receiving information that is not interest to the viewer.

It should be noted that in one embodiment, an option can also be presented to the viewer of the vlog as to whether the viewer is willing to opt-in for receiving ads. In the previous example, the viewer does not have this option. For example, a viewer may receive some rewards or incentives for opting-in to receive such ads, e.g., discounts on products or services, free usage of a service feature provided by a network service provider, and the like.

In another embodiment, mobile vlog server 121 may retrieve the latest presence information of mobile device 112 from the PS 123 using flow 136. Using the most current location information of the mobile device 112, mobile vlog server 121 can determine the most relevant ads that can be inserted. For example, if it is determined that the mobile device 112 is proximate to a particular retail store or a particular restaurant, then related ads associated with that particular retail store or that particular restaurant can be inserted when the viewer using the mobile device 112 initiates a vlog viewing session with the mobile vlog server 121.

In one embodiment, the user of the PC device 113 is a video bog viewer. The user, or the viewer, accesses a video blog (vlog) viewing service portal that is supported by the mobile vlog server 121 using PC 113 via flow 135 (e.g., a wire based connection).

Mobile vlog server 121 may provide a web browser based application to the PC 113 to allow the viewer to view live streaming or uploaded video contents via the PC 113 through the World Wide Web that have been posted by mobile vlogger of the mobile device 111. Again, note that viewers using the PC 113 are different from the mobile vloggers where viewers view video contents posted by the mobile vloggers.

Similarly, features of the vlog viewing service portal accessed by the PC device 113 may include the ability to comment and reply on a mobile vlog, rate a mobile vlog, view vlogs by groups and categories, view vlogs by the most viewed, view vlogs by the highest rating, and so on.

In one embodiment, if the mobile vlogger has opted in for the ad insertion feature, then mobile vlog server 121 may retrieve subscriber profile data of the viewer of the PC 113 from HSS 122, using flow 133, to insert ads that are relevant to the viewer when a viewing session is initiated. In one embodiment, HSS 122 contains information of the viewer using PC 113 including usage patterns and preferences that can be used to select relevant ads to be inserted according to the subscriber profile information.

In one embodiment, video content server 114 is a content server owned and operated by an enterprise that may utilize video contents in a business operation, e.g., a journalism company or news organization. The journalism company has created one or more APIs into the web browser based application of the mobile vlog viewing service portal that is supported by the mobile vlog server 121. Through the APIs, video content server 114 will be able to filter the video contents, e.g., amateur journalist video contents, and to retrieve and store the filtered contents using flow 134. The filtered video contents can then be used for broadcast or re-broadcast by the journalism company. In addition, the journalism company can validate contents and news by contacting an amateur journalist who has posted the mobile vlog contents via email or instant messaging (IM) information embedded within the mobile vlog posted.

Figure 2:
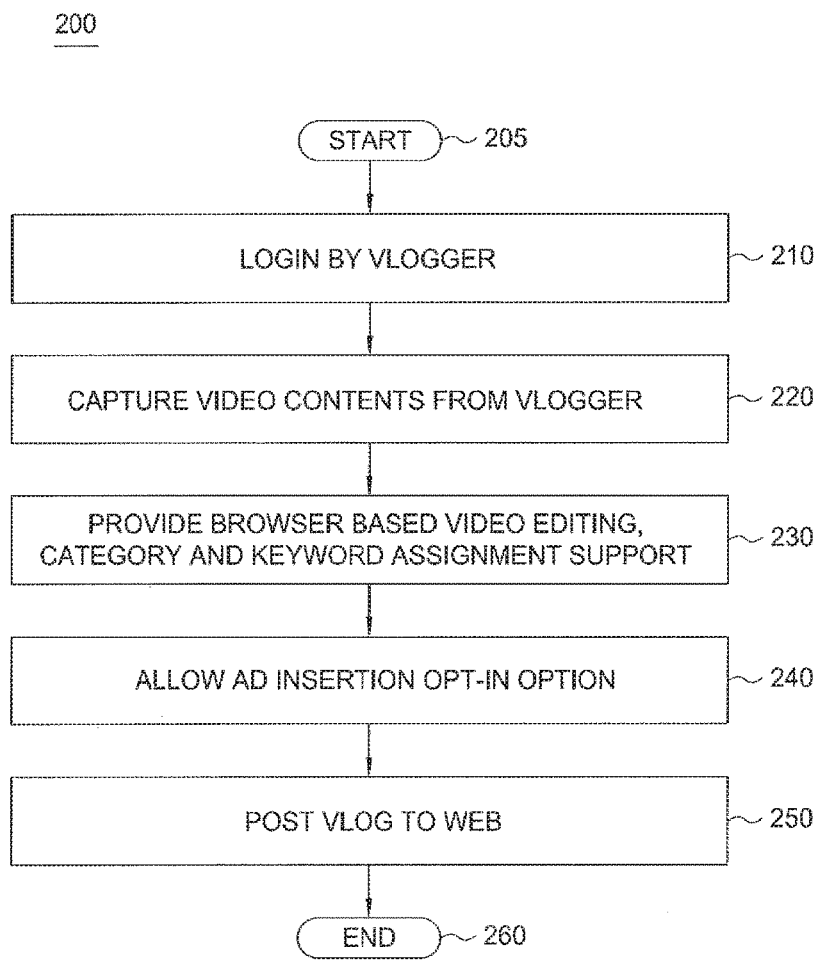
FIG. 2 illustrates a flowchart of an exemplary method for providing video blog posting service portal functions to enable the convergence of wireless subscriber community and web community using mobile video blog and service portal in accordance with one embodiment of the present invention.

FIG. 2 illustrates a flowchart of a method 200 for providing video blog posting service functions to enable a convergence of the wireless subscriber community and the web community providing a mobile video blog service of the present invention. For example, one or more steps of method 200 can be executed by a mobile vlog server.

Method 200 starts in step 205 and proceeds to step 210. In step 210, the method receives a login at the mobile vlog posting service portal by a mobile vlog user, e.g., a mobile vlogger.

In step 220, the method captures or receives video contents sent from a mobile device used by the mobile vlogger. For example, video contents may comprise live streaming videos or uploaded video files.

In step 230, the method provides one or more vlog templates that a mobile vlogger can select, browser based video editing capabilities (like adding fades, video effects or splicing functionality), and/or category and key words assignment functions for labeling of the video contents. For example, the method may provide support of video editing functionality and live video streaming integration for live events. Using a browser based application, video capture components of the mobile device including camera, video codecs, and any other video capture capabilities are integrated. The browser based application integrates these videos into a blog format via the mobile vlog posting service portal, thereby creating the mobile video blog. The application also allows a mobile vlogger to choose from a selection of vlog templates that can be used on the video contents, e.g., having a predefined layout or format and the like. For example, the application may provide classification support of vlogs by categories, such as "amateur journalism", "entertainment", or "personal" that can be selected and classified by the mobile vlogger.

In step 240, the method allows the mobile vlogger to opt in for ad insertion. If the mobile vlogger chooses the ad insertion opt-in option, then relevant ads will be inserted to video viewing sessions initiated by viewers based on the viewers' profile information.

In step 250, the method enables the posted mobile vlog to be shared to a community both public and private as specified within the browser based application by the mobile vlogger. For example, the method provides post-to-web server functionality both as uploaded video file or live streaming video, and community or social networking capabilities to tie captured videos into other social networking communities through Application Programming Interfaces (API). The method ends in step 260.

Figure 3:
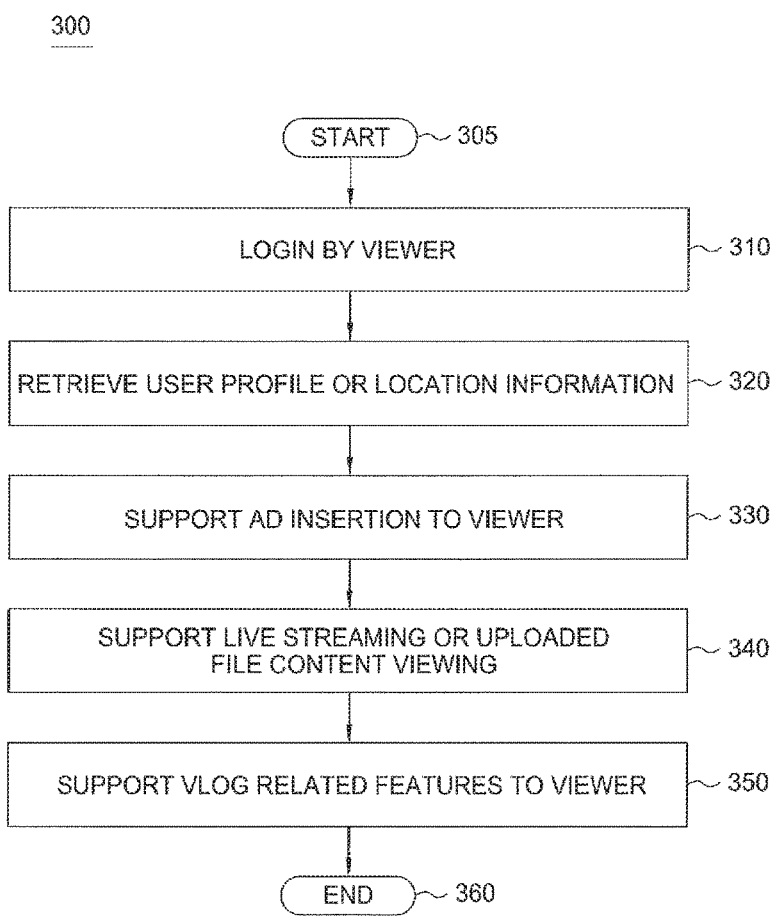
FIG. 3 illustrates a flowchart of an exemplary method for providing video blog viewing service portal functions to enable the convergence of wireless subscriber community and web community using mobile video blog and service portal in accordance with one embodiment of the present invention.

FIG. 3 illustrates a flowchart of a method 300 for providing video blog viewing service portal functions to enable a convergence of the wireless subscriber community and the web community by using a mobile video blog and service portal of the present invention. For example, one or more steps of method 300 can be executed by a mobile vlog server.

Method 300 starts in step 305 and proceeds to step 310. In step 310, the method receives a login at the vlog viewing service portal by a vlog viewer, e.g., broadly a viewer. Note that the viewer can access the mobile posted vlog using mobile or non-mobile devices.

In step 320, the method retrieves the subscriber profile information of the viewer from a HSS. Furthermore, the method may also retrieve the current location information of the viewer from a PS, if appropriate, e.g., when the device used by the viewer is a mobile device.

In step 330, the method uses the retrieved subscriber profile and/or viewer's current location information to insert ads relevant to the viewer when a viewing session is initiated. For example, HSS contains information of the viewer including usage patterns and preferences (e.g., gender of the viewer, age of the viewer, viewing preference of the viewers such as sports, current events, financial news, traffic news, weather, shopping patterns, and so on) that can be used to select relevant ads to be inserted according to the subscriber or viewer profile information. Furthermore, in the case that the endpoint device is a mobile device, the current location information of mobile device retrieved from the PS can be used to determine the relevant ads that can be inserted based on location information associated with the mobile device that is being used for viewing the vlog.

In step 340, the method provides support of live streaming or uploaded file video contents viewing to the viewer. In one embodiment, the method provides a web browser based application to allow the viewer to view live streaming or uploaded video contents via the World Wide Web that have been posted by mobile vloggers. In another embodiment, the method supports an API that can be used by external users, such as journalism companies, to filter mobile vlog contents and to retrieve them to an external content server for broadcast or rebroadcast purposes.

In step 350, the method provides mobile vlog related feature support to the viewer. For example, using the browser based application, the method supports features of mobile vlog viewing that may include the ability to comment and reply on a mobile vlog, rate a mobile vlog, view vlogs by groups and categories, view mobile vlogs by the most viewed, view mobile vlogs by the highest rating, and so on. The method ends in step 360.

It should be noted one or more steps of methods 200 and 300 can be deemed to be optional. For example, steps 240 and 330 can be omitted.

It should be noted that although not specifically specified, one or more steps of methods 200 and 300 may include a storing, displaying and/or outputting step as required for a particular application. In other words, any data, records, fields, and/or intermediate results discussed in the methods 200 and 300 can be stored, displayed and/or outputted to another device as required for a particular application. Furthermore, steps or blocks in FIGS. 2 and 3 that recite a determining operation, or involve a decision, do not necessarily require that both branches of the determining operation be practiced. In other words, one of the branches of the determining operation can be deemed as an optional step.

Figure 4:
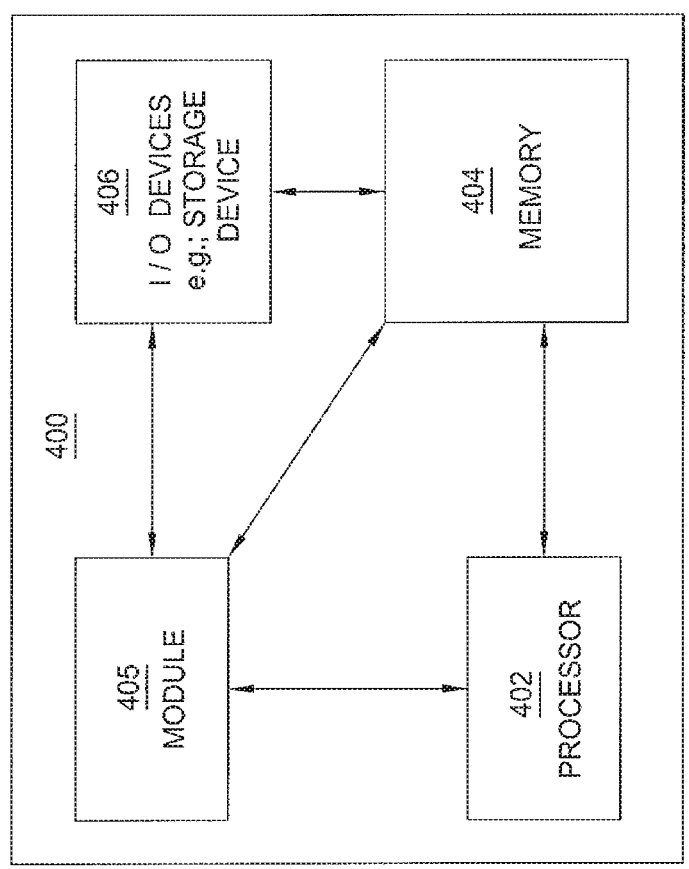
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for converging wireless subscriber community and web community by using a mobile video blog and service portal, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for converging wireless subscriber community and web community by using a mobile video blog and service portal can be loaded into memory 404 and executed by processor 402 to implement the functions as discussed above. As such, the present process 405 for converging wireless subscriber community and web community by using a mobile video blog and service portal (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   receiving, by a server, a login request from a viewer through a video blog viewing service portal of the server; and
   providing, by the server, a video blog viewing function accessible to the viewer through the video blog viewing service portal of the server, wherein the video blog viewing function affords viewing of a video content and is provided in accordance with current location information of the viewer, when an endpoint device used by the viewer comprises a mobile device, wherein the video content was posted from a mobile device that is associated with a mobile user through a mobile video blog posting service portal of the server of a communication network.

2. The method of claim 1, wherein the communication network comprises an internet protocol multimedia subsystem based network.

3. The method of claim 1, wherein the video content comprises a streaming video.

4. The method of claim 1, wherein the video content comprises a video file.

5. The method of claim 1, wherein the providing the video blog viewing function comprises: allowing the viewer to view the video content via a web browser based application.

6. The method of claim 1, wherein the providing the video blog viewing function comprises: supporting an application programming interface to allow the viewer to retrieve the video content to an external content server.

7. The method of claim 1, further comprising: providing one or more functions that allow the viewer to comment on the video content, to rate the video content, to view the video content by category, to view the video content by most viewed, or to view the video content by a highest rating.

8. A non-transitory computer-readable medium storing instructions which, when executed by a processor of a server of a communication network, cause the processor to perform operations, the operations comprising:
   receiving a login request from a viewer through a video blog viewing service portal of the server; and
   providing a video blog viewing function accessible to the viewer through the video blog viewing service portal of the server, wherein the video blog viewing function affords viewing of a video content and is provided in accordance with current location information of the viewer, when an endpoint device used by the viewer comprises a mobile device, wherein the video content was posted from a mobile device that is associated with a mobile user through a mobile video blog posting service portal of the server of a communication network.

9. The non-transitory computer-readable medium of claim 8, wherein the communication network comprises an internet protocol multimedia subsystem based network.

10. The non-transitory computer-readable medium of claim 8, wherein the video content comprises a streaming video.

11. The non-transitory computer-readable medium of claim 8, wherein the video content comprises a video file.

12. The non-transitory computer-readable medium of claim 8, wherein the providing the video blog viewing function comprises: allowing the viewer to view the video content via a web browser based application.

13. The non-transitory computer-readable medium of claim 8, wherein the providing the video blog viewing function comprises: supporting an application programming interface to allow the viewer to retrieve the video content to an external content server.

14. The non-transitory computer-readable medium of claim 8, the operations further comprising: providing one or more functions that allow the viewer to comment on the video content, to rate the video content, to view the video content by category, to view the video content by most viewed, or to view the video content by a highest rating.

15. A system comprising:
   a processor of a server of a communication network; and
   a non-transitory computer-readable medium storing instructions which, when executed by the processor, cause the processor to perform operations, the operations comprising:
      receiving a login request from a viewer through a video blog viewing service portal of the server; and
      providing a video blog viewing function accessible to the viewer through the video blog viewing service portal of the server, wherein the video blog viewing function affords viewing of a video content and is provided in accordance with current location information of the viewer, when an endpoint device used by the viewer comprises a mobile device, wherein the video content was posted from a mobile device that is associated with a mobile user through a mobile video blog posting service portal of the server of a communication network.

16. The system of claim 15, wherein the communication network comprises an internet protocol multimedia subsystem based network.

17. The system of claim 15, wherein the video content comprises a streaming video.

18. The system of claim 15, wherein the video content comprises a video file.

19. The system of claim 15, wherein the providing the video blog viewing function comprises: allowing the viewer to view the video content via a web browser based application.

20. The system of claim 15, wherein the providing the video blog viewing function comprises: supporting an application programming interface to allow the viewer to retrieve the video content to an external content server.

* * * * *